Figure 4:
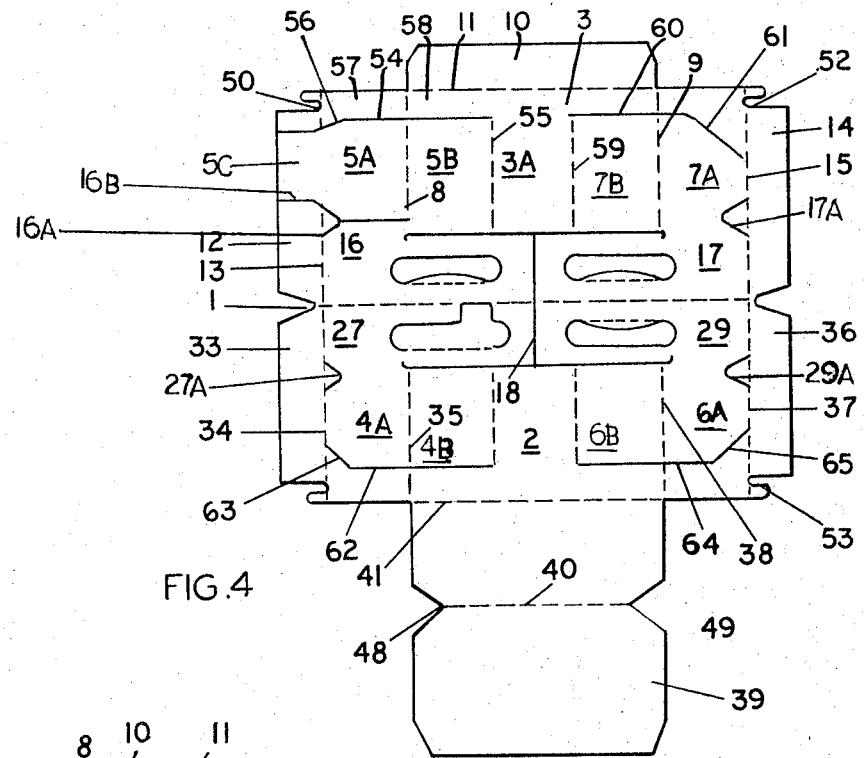

April 25, 1967 H. W. FORRER 3,315,838
LAMINATED ARTICLE CARRIER
Filed April 2, 1965 4 Sheets-Sheet 1
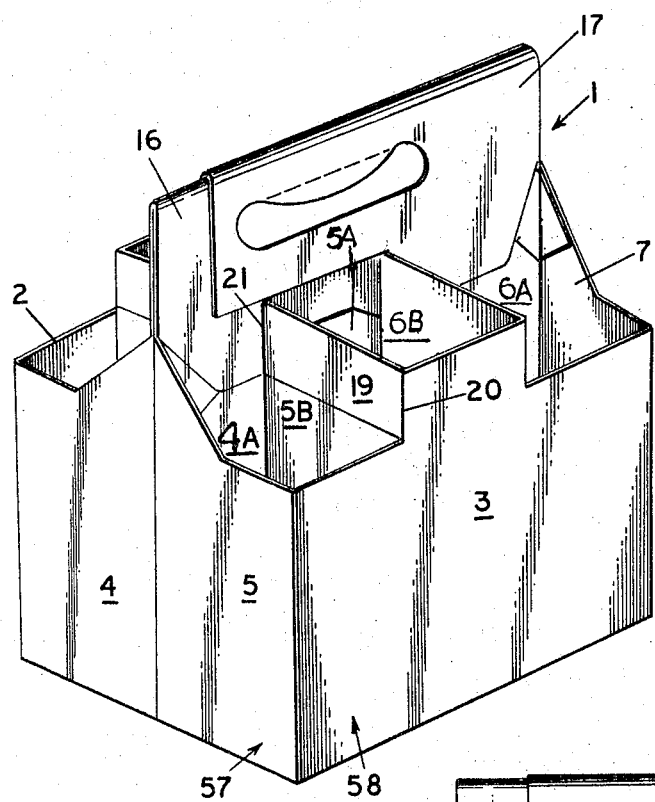
FIG.1
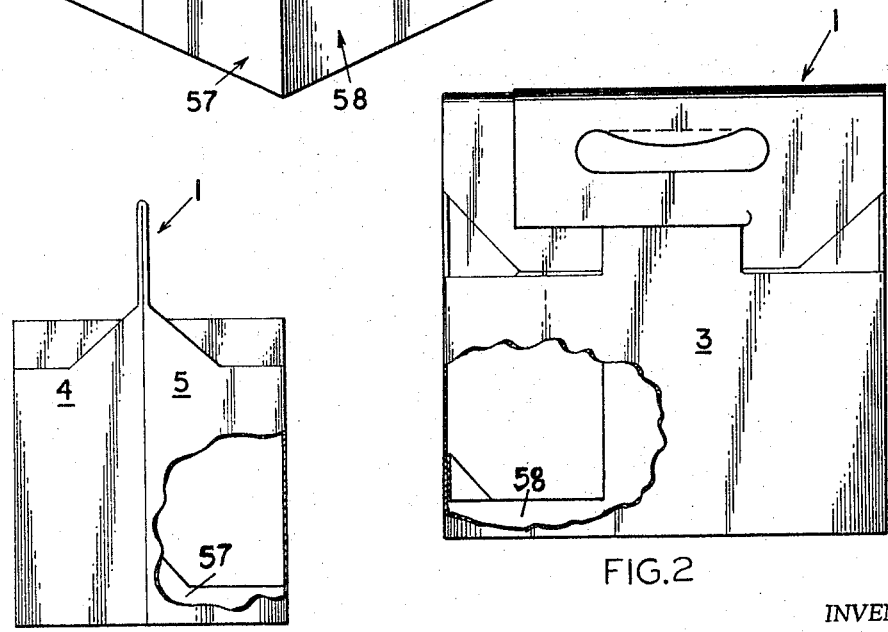
FIG.2
FIG.3
INVENTOR
HOMER W. FORRER
BY Walter M. Rodgers
ATTORNEY April 25, 1967 H. W. FORRER 3,315,838
LAMINATED ARTICLE CARRIER
Filed April 2, 1965 4 Sheets-Sheet 2

INVENTOR
HOMER W. FORRER
BY Walter M. Rodgers
ATTORNEY

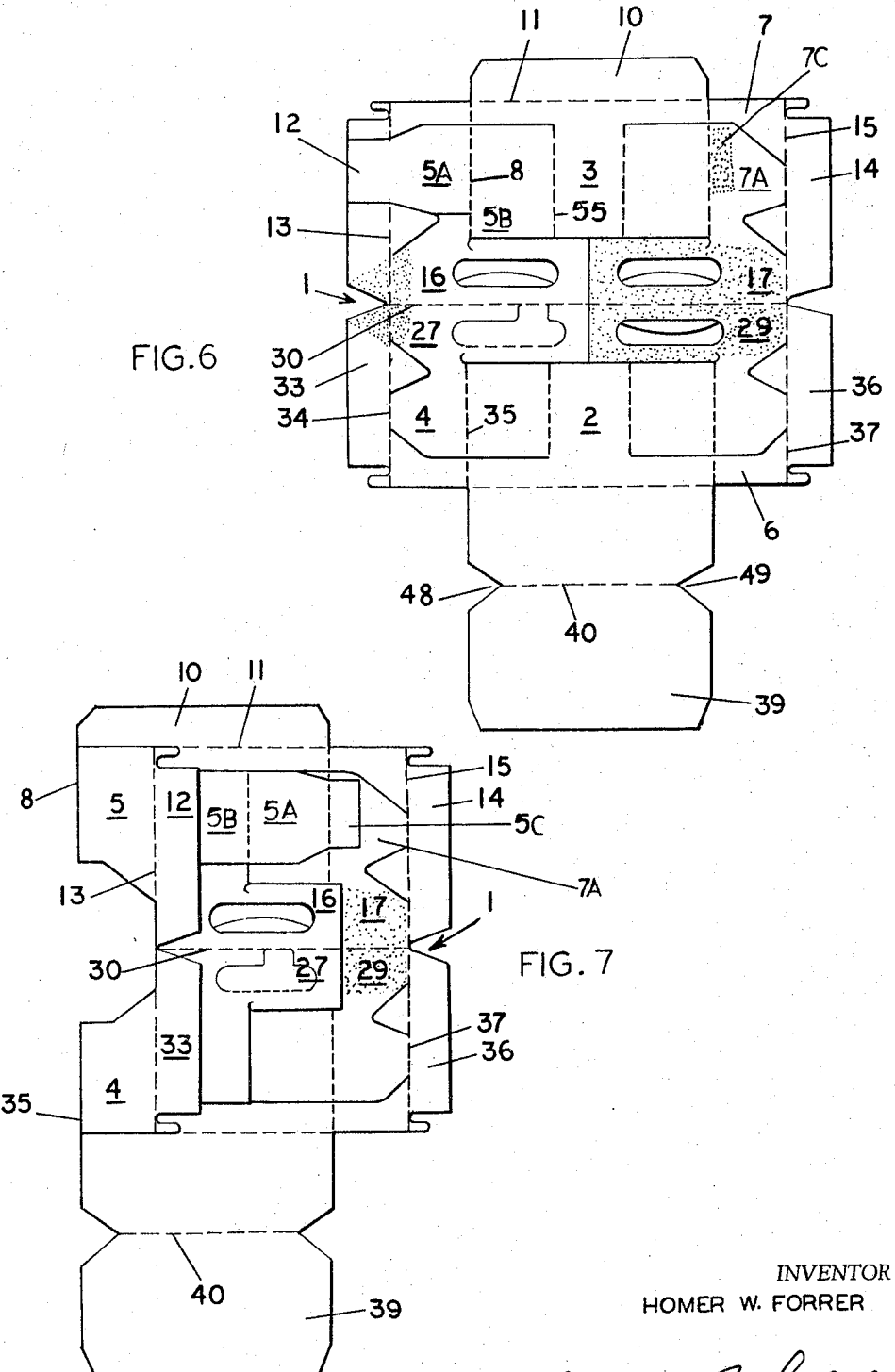

April 25, 1967   H. W. FORRER   3,315,838
LAMINATED ARTICLE CARRIER
Filed April 2, 1965   4 Sheets-Sheet 4
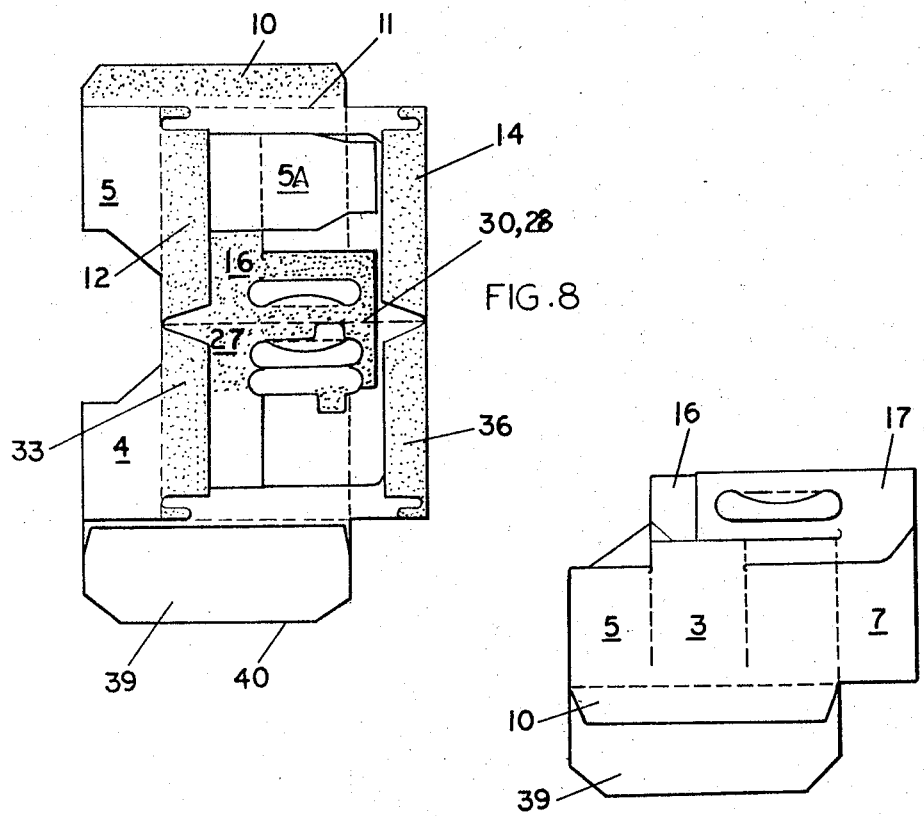
INVENTOR
HOMER W. FORRER
BY Walter M. Rodgers
ATTORNEY United States Patent Office 3,315,838
Patented Apr. 25, 1967

3,315,838
LAMINATED ARTICLE CARRIER
Homer W. Forrer, Jonesboro, Ga., assignor to The Mead Corporation, a corporation of Ohio
Filed Apr. 2, 1965, Ser. No. 445,096
9 Claims. (Cl. 220—113)

This invention relates to laminated article carriers and more particularly to carriers wherein two plies of material are utilized, the construction being such that partitions of substantial depth are formed by one-ply and wherein two-ply laminated areas are utilized in areas of substantial stress.

U.S. Patent 2,537,452 discloses and claims a sturdy economical carrier wherein transverse partitions are of partial depth only and are commonly known as straps and the carrier itself is frequently called a "strap style" carrier. Procedures for manufacturing this carrier are well known and its commercial acceptance has been substantial. Such carriers are widely used commercially due in part to the fact that efficient use of material is made in constructing the carrier although the so-called "strap style" carrier does not afford complete separation between adjacent articles disposed alongside each other in the carrier.

A principal object of this invention is to provide an improved carrier which is basically similar to the so-called "strap style" carrier and which therefore can be manufactured by substantially the same procedure but which includes partition structure of substantial depth and hence complete separation of adjacent articles within the carrier is provided.

Another object of the invention is the provision of a laminated carrier construction wherein two plies of material are utilized in regions of relatively high stress and wherein a single-ply construction is utilized as a partitioning structure in regions not normally subjected to substantial stress.

Still another object of the invention is to provide a carrier of the full depth type using a minimum of material.

The invention in one form as applied to an article carrier of partially laminated construction comprises a laminated two-ply handle construction, a laminated two-ply riser panel foldably joined at the ends of the handle panel, an end panel and an end portion of a side wall of single-ply construction together with single-ply medial and transverse separating panels, and a laminated central side wall portion, the various panels being interrelated in a manner similar to a strap style carrier and yet constituting a carrier of full depth type of construction. If desired certain areas of the carrier handle may be of single-ply construction if the proper weight of material is used.

Figure 5:
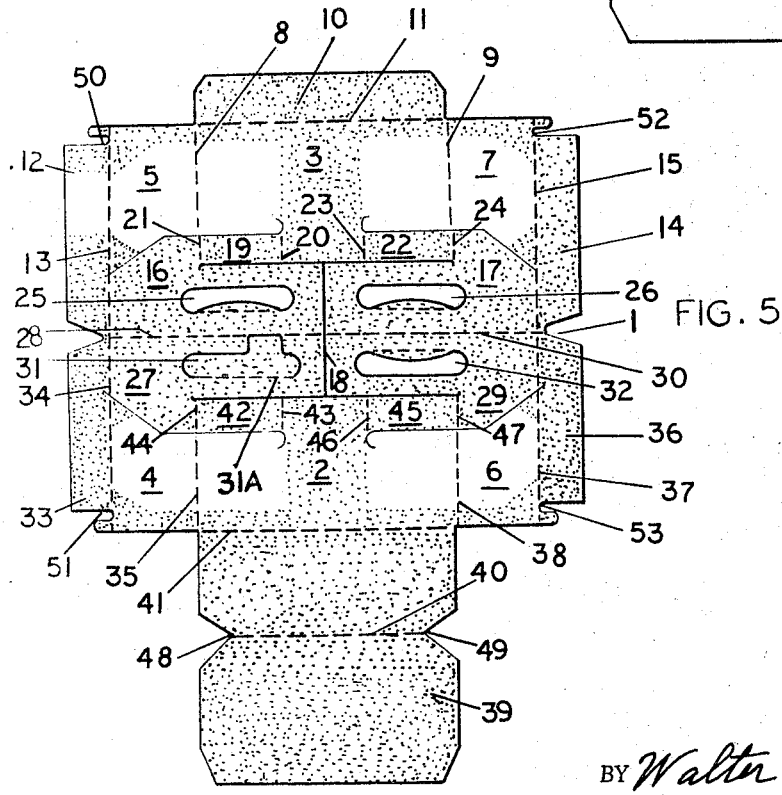

For a better understanding of the invention, reference may be had to the following detailed description taken in conjunction with the accompanying drawings in which FIG. 1 is a perspective view of a carrier of laminated construction and made according to the invention; FIG. 2 is a side view of the carrier shown in FIG. 1 with a portion of the side wall broken away; FIG. 3 is an end view of the carrier shown in FIGS. 1 and 2 with a portion of the end wall broken away; FIG. 4 is a plan view of the inner-ply of a two-ply blank used to construct the carrier according to the invention; FIG. 5 is a plan view of the outer-ply of the blank, the blanks of FIGS. 4 and 5 being placed in face contacting relation and laminated together in certain areas in accordance with the invention; FIG. 6 is a plan view of a laminated blank constructed of the inner and outer plies depicted in FIGS. 4 and 5 and as such structure appears from the inside; and in which FIGS. 7, 8 and 9 are views of successive folding and gluing operations through which the laminated blank of FIG. 6 is manipulated in order to produce the final collapsed carrier as shown in FIG. 9.

With reference to the drawings, the handle structure is generally designated by the numeral 1 and the side walls are designated by the numerals 2 and 3. End panels 4 and 5 are disposed at one end of the carrier and are foldably joined to the ends of the side panels 2 and 3. End panels 6 and 7 are disposed at the other end of the carrier.

The formation of the partially laminated composite blank can best be understood from FIGS. 4, 5 and 6. In order to form the composite blank depicted in FIG. 6 an application of glue is made as indicated by the stippled areas in FIG. 5. Thereafter, the inner-ply represented by FIG. 4 is placed into flat face contacting relation atop the outer liner depicted in FIG. 5. Thereafter, the composite partially laminated blank appears as depicted in FIG. 6.

The outer-ply depicted in FIG. 5 is essentially the same as the blank from which the carrier of patent 2,537,452 is constructed. Thus the end panel 5 is foldably joined to the side wall 3 along fold line 8, while the end panel 7 is foldably joined to the other end of side wall 3 along fold line 9. A lap panel 10 is foldably joined to the bottom edge of side wall 3 along fold line 11. A riser panel 12 is foldably joined along fold line 13 to the end panel 5 while a similar riser panel 14 is foldably joined to the end panel 7 along fold line 15. Handle panel 16 is foldably joined along the fold line 13 to the riser panel 12 and a similar handle panel 17 is foldably joined along fold line 15 to the riser panel 14. Handle panels 16 and 17 are separated from each other by a cut line 18. A partition strap 19 is foldably joined along the short fold line 20 to the side wall 3 and to the handle panel 16 along the short fold line 21. Strap 22 is foldably joined to the side wall 3 along the short fold line 23 and at the other end to the handle panel 17 along the short fold line 24. Hand gripping apertures 25 and 26 are formed respectively in the handle panels 16 and 17.

The other side of the carrier is of a similar construction. For example, handle panel 27 is foldably joined along medial fold line 28 to handle panel 16 and handle panel 29 is foldably joined along the fold line 30 to handle panel 17. Hand gripping apertures 31 and 32 are formed in handle panels 27 and 29. The material which is cutout to form the aperture 31 is foldably joined at the line 31A to the panel 27. Riser panel 33 is foldably joined along fold line 34 to the end edge of handle panel 27 and end panel 4 is foldably joined to the edge of riser panel 33 along the fold line 34. End panel 4 is foldably joined to the end of side wall 3 along fold line 35. Handle panel 29 is foldably joined to riser panel 36 along fold line 37 and end panel 6 is foldably joined to riser panel 36 along fold line 37. End panel 6 is foldably joined to side wall 2 along fold line 38. A bottom panel 39 having a medial fold line 40 is foldably joined to the bottom edge of side wall 2 along fold line 41.

Partitioning strap 42 is foldably joined to side wall 2 along the short fold line 43 at one end and at the other end is foldably joined to the handle panel 27 along the short fold line 44. Partition strap 45 is foldably joined along the short fold line 46 to the side panel 2 at one end and at the other end is foldably joined to the handle panel 29 along the short fold line 47. A pair of notches 48 and 49 are formed at the ends of fold line 40 in the bottom panel 39 and cooperate in known fashion with the notches 50, 51, 52 and 53 formed respectively in the riser panels 12, 33, 14 and 36.

An examination of FIGS. 4 and 5 indicates that these blanks are quite similar in their basic essentials although not identical. The common elements in FIG. 4 have been designated by the same numerals as the corresponding parts of FIG. 5. The inner-ply designated in FIG. 4 incorporates a number of cut lines not incorporated in FIG. 5. For example, cut line 54 extends from fold line 55 and changes direction as indicated at 56 to terminate at the outer edge of riser panel 12 to define flap 5C. The cut line 54 aids in defining a single-ply medial partition panel which is bounded at one end by the cut lines 54 and 56 and along its sides by the fold lines 13 and 8 and which corresponds generally with the end panel 5 of FIG. 5, the medial partition panel being designated in FIGS. 4 and 7 by the designation 5A. The cut lines 54 and 56 also define the end reinforcing panel 57 which extends between the fold line 13 and the fold line 8 and which is laminated to the bottom edge of end panel 5. The cut line 54 also defines the side reinforcing panel 58 which extends from the fold line 8 to the fold line 55 and is integrally formed with the central portion of the side wall 3 designated at 3A and which extends between the fold line 55 and the fold line 59. The cut line 54 also defines a single-ply transverse partition panel designated 5B in FIG. 4 and which is bounded by the cut line 54 at the bottom and by the fold lines 8 and 55 and the strap 19.

Also formed in the inner-ply of the composite blank as depicted in FIG. 4 are the cut lines 60 and the angularly disposed portion thereof designated by 61. Likewise, the cut line 62 and the angular portion 63 thereof as well as the cut line 64 and the angular portion 65 thereof are formed in the inner blank depicted in FIG. 4 and define side and end reinforcing panels as well as medial single-ply partition panels and transverse single-ply partition panel generally as described above. Cut lines 61, 63 and 65 extend only to the fold lines 15, 34 and 37 respectively while as explained the cut line 56 extends to the outer edge of riser panel 12. As will be explained panels 4A, 6A and 7A become medial partition panels and panels 4B, 6B and 7B become transverse partition panels.

V-shaped cuts 16A, 17A, 27A and 29A are formed in the inner blanks of FIG. 4 but not in the outer blank of FIG. 5. One leg of cut 16A is extended at 16B to free the flap 5C.

The blanks of FIGS. 4 and 5 are shown in finished condition with all fold and all cut lines indicated on these views for the sake of clarity and simplicity. It will be understood that the inner blank is preferably die cut first with only the cut lines unique to the inner blank being cut. Thus lines 54, 56, 60, 61, 62, 63, 64, 65, 16A, 16B, 17A, 27A and 29A are cut in the inner blank of FIG. 4. The blanks are then secured together and the remaining lines are cut into the composite blank.

Once the composite blank as depicted in FIG. 6 is formed from the inner and outer plies depicted in FIGS. 4 and 5, respectively, the various gluing and folding operations may then be effected to complete the carrier.

For example, an application of glue is applied to the composite blank as indicated by the stippled areas in FIG. 6. The blank is then manipulated so as to assume the condition depicted in FIG. 7. In order to fold the blank of FIG. 6 so that it appears as depicted in FIG. 7, the handle panels 16 and 17 are simply lifted upwardly and toward the right causing the end panels 4 and 5 to swing over along the fold lines 35 and 8, respectively, while the riser panels 12 and 33, respectively, swing over along the fold lines 13 and 34 into flat face contacting relation with the handle panels 16 and 17 respectively. Of course, the stippled areas of riser panels 12 and 33 indicating glue become securely affixed to the corresponding areas of inner surfaces of handle panel 16 and 17 upon completion of this folding operation. Of course, the outer surfaces of the handle panels 16 and 17 become affixed to the inner surfaces of the handle panels 17 and 29. The blank then appears as depicted in FIG. 7. During this operation panels 5A and 5B of the inner blank are swung over along line 55 and the flap 5C is adhered to stippled area 7C of medial partition panel 7A so that panel 5A becomes a medial partition panel for the middle cells of the carrier.

The carrier as depicted in FIG. 7 is made to appear as indicated in FIG. 8 by simply swinging the two riser panels 14 and 36 up and over along the fold lines 15 and 37, respectively, so that the adjacent ends of the riser panels 14 and 36 become adhered to the inner surfaces of handle panels 17 and 29 respectively. Simultaneously, the bottom panel 39 is folded along its medial fold line 40 and the auxiliary panel struck from handle 27 is folded down along line 31A. Thereafter, an application of glue is made as indicated by the stippling in FIG. 8.

In order to cause the carrier as depicted in FIG. 8 to appear in finished collapsed form as shown in FIG. 9, it is simply necessary to fold the carrier along the medial fold line 30, 28 so that the riser panel 12 comes into face contacting relation with the riser panel 36. Simultaneously, the inner surface of handle panel 16 is affixed to the inner surface of handle panel 27 and the lap panel 10 is secured to the outer edge of bottom panel 39. Simultaneously, auxiliary panel is affixed to panel 5A to provide added strength to the carrier.

When the carrier in collapsed form as depicted in FIG. 9 is set up into the position depicted in FIG. 1, the single-ply medial partition panel 5A of the inner-ply is disposed immediately underneath the handle panel 16 and the single-ply transverse partition panel 5B is disposed between the handle panel 16 and the side wall 3 so as to separate the article at the end of the carrier from the center article packaged therein.

As viewed in FIG. 3 the end reinforcing strip 57 can be seen. Likewise, the side reinforcing strip 58 can be seen in FIG. 2.

From the description above, it is apparent that the carrier according to this invention may be formed on the same equipment which forms the carrier of Patent 2,537,452 and that such a carrier according to this invention is of the full depth type. Where strength is required a two-ply laminated construction is utilized and where substantial strength is not required a single-ply partition panel in the form of certain panels comprising the inner lining is utilized.

While the inner blank as depicted in FIG. 4 is of the same size and configuration as the outer blank depicted in FIG. 5, it will be understood that for some applications of the invention, it would not be necessary to incorporate certain areas in the inner blank. For example, it may be desirable to eliminate the handle panels and possibly the bottom panel from the inner liner and simply to incorporate the sides, ends and partition panels into the inner liner.

While particular embodiments of the invention have been shown and described, the invention is not limited thereto and it is intended in the appended claims to cover all such changes and modifications as fall within the true spirit and scope of the invention.

The embodiments of the invention in which an exclusive property or privilege is claimed are defined as I claim:

1. An article carrier of partially laminated construction comprising a handle including a handle panel, a laminated two-ply riser panel foldably joined to said handle panel along an end edge thereof, an end panel of single-ply construction foldably joined to an edge of one ply of said riser panel which is generally in alignment with the fold line between said handle panel and said riser panel, a side wall foldably joined to said end panel along a fold line remote from the fold line between said riser panel and said end panel, a single-ply medial partition panel foldably joined to the other ply of said riser panel and disposed underneath and generally in alignment with said handle panel, a transverse partition panel foldably joined to said medial partition panel along an edge thereof remote from the fold line between said medial partition panel and said riser panel, and a central inner side wall panel laminated to the central portion of said side wall and foldably joined to said transverse partition panel along an edge thereof remote from the fold line between said transverse partition and said medial partition panel.

2. A carrier according to claim 1 wherein a transverse partition strip is foldably joined to said side wall at one end thereof and to said handle panel at the other end thereof and wherein said strip is laminated to said transverse partition panel.

3. A carrier according to claim 1 wherein said end panel is foldably joined to the outer ply of said riser panel.

4. A carrier according to claim 1 wherein said medial partition panel is foldably joined to the inner ply of said riser panel.

5. A carrier according to claim 1 wherein a side reinforcing strip is formed integrally with said central inner side wall panel and laminated to said side wall.

6. A carrier according to claim 1 wherein an end reinforcing strip is foldably joined to one ply of said riser panel and laminated to said end panel.

7. A carrier according to claim 1 wherein said handle panel is of laminated two-ply construction.

8. A carrier according to claim 1 wherein a flap is struck out of said other ply of said one riser panel and wherein another laminated two-ply riser panel is foldably joined to the other end of the carrier handle and wherein a single-ply medial partition panel is foldably joined to one ply of said another riser panel to form a second medial partition panel at the other end of the carrier, said flap being affixed to said second medial partition panel.

9. A carrier according to claim 1 wherein a side reinforcing strip is formed integrally with said central inner side wall panel and laminated to said side wall and wherein an end reinforcing strip is foldably joined to one ply of said riser panel and laminated to said end panel and wherein adjacent ends of said side and end reinforcing strips are foldably joined together.

References Cited by the Examiner

UNITED STATES PATENTS

| | | | |
|---|---|---|---|
| 3,166,213 | 1/1965 | Holmes | 229—28 |
| 3,190,487 | 6/1965 | Wood | 229—28 |

JOSEPH R. LECLAIR, *Primary Examiner.*

R. PESHOCK, *Assistant Examiner.*